(12) United States Patent
Graham et al.

(10) Patent No.: US 7,918,285 B1
(45) Date of Patent: Apr. 5, 2011

(54) IMPLEMENT WITH ACTIVE WING DOWN FORCE AND WING LIFT SEQUENCING

(75) Inventors: William Douglas Graham, East Moline, IL (US); Aaron L. Barfels, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/762,611

(22) Filed: Apr. 19, 2010

(51) Int. Cl.
*A01B 63/111* (2006.01)
*A01B 63/00* (2006.01)

(52) U.S. Cl. .......................................... 172/2; 172/452

(58) Field of Classification Search .................. 37/348; 172/2–11, 310, 311, 451–453, 465, 491, 172/239, 463, 464; 111/59, 62, 22, 25; 91/518, 91/520, 522, 523, 528, 530, 536
See application file for complete search history.

(56) References Cited

U.S. PATENT DOCUMENTS

| | | | | |
|---|---|---|---|---|
| 4,878,545 A * | 11/1989 | Dyken | ........................... | 172/776 |
| 5,303,779 A * | 4/1994 | Friggstad | ....................... | 172/311 |
| 6,035,943 A * | 3/2000 | Gerein et al. | ................ | 172/328 |
| 6,068,063 A * | 5/2000 | Mayerle et al. | ............... | 172/315 |
| 6,318,477 B1 * | 11/2001 | Bettin | ........................... | 172/452 |
| 6,698,523 B2 * | 3/2004 | Barber | ............................ | 172/4 |
| 7,478,683 B2 * | 1/2009 | Peck et al. | ..................... | 172/456 |
| 2010/0078185 A1 | 4/2010 | Carlz | | |

* cited by examiner

*Primary Examiner* — Robert E Pezzuto

(57) ABSTRACT

A hydraulic latching circuit is provided that allows a load-sense power source to be activated and deactivated depending on the SCV function. The load sense power source is activated when the wing cylinders are fully extended to maintain proper down force on the wings. It remains activated or latched when the SCV is returned to neutral. It is deactivated or unlatched when the wing cylinders are retracted. Two circuits have been devised to accomplish this latching function. Both of these latching circuits can be used with the sequencing circuit.

10 Claims, 2 Drawing Sheets

IMPLEMENT WITH ACTIVE WING DOWN FORCE AND WING LIFT SEQUENCING

BACKGROUND

Agricultural tractor hydraulic systems which operate high capacity equipment typically generate a considerable amount of heat which must be dissipated. For example, an implement such as a large seeding tool with a hydraulically driven fan often includes an active hydraulic down force system which operates simultaneously with the fan. Using the tractor selective control valve (SCV) to apply continuous pressure consumes extra engine power and may cause overheating of the tractor hydraulic system. A load sensing system keeps the system pressure at the lowest possible level. Many tractors include an additional output port, referred to as a power beyond supply. The power beyond port provides an external load sense option. However, the power beyond system does not allow the operator to control its output. There is a need to supply a load sensed pressure to the system while allowing the system to be controlled by a non-load sensed control valve.

To prevent load sense pressure from commanding pump flow during tractor engine startup, thus creating tractor starting issues under certain circumstances, it is necessary to prevent load sense signal pressure from being communicated to the tractor during engine startup. This could be done with an electric solenoid valve but an electrical signal would have to be present and made available to the circuit. A method to accomplish activation and deactivation of the down force is needed that does not require an electrical signal. Since not all tractors are equipped with power beyond, it is also beneficial to be able to provide down force pressure to the wing cylinders using an SCV connection.

The sequencing of the wing lift and the center frame lift as well as sequencing of the center frame lowering and the wing lowering are crucial. The wings must lift before the center frame lifts and must stay lifted until after the center frame is lowered. Adding continuous back pressure to the wing cylinders through an active down force system creates a challenge for proper sequencing.

The former method of sequencing the wing and center frame raise and lower functions uses cylinder size and atmospheric pressure to achieve the correct sequencing. When the SCV is actuated to raise the center frame, the pressure required to retract the wing cylinders is less than the pressure required to extend the center frame cylinders. Therefore, the wings lift before the center frame is raised. When the SCV is actuated to lower the center frame, the back pressure caused by oil returning from the center frame cylinders is enough to keep the wing cylinders retracted. When the center frame cylinders fully retract, the flow drops and pressure drops, allowing the wing cylinders to extend.

A partial solution to the above problems is provided in US Patent Publication US2010/0078185, commonly assigned with the present application and hereby incorporated by reference. There, additional valve components are configured into the active down force circuit to cause the tractor hydraulic system to operate below the stall or high pressure standby condition. A check valve connects the tractor power beyond supply line to the pressure reduction valve that is connected to the implement cylinder ends and controls down pressure. The tractor selective control valve is then operated at load pressure in the float mode when the down force circuit is controlling implement down pressure. The circuit eliminates a stall signal to the hydraulic pump that otherwise would cause the pump to rise to the high, heat-producing stall pressure when operating in the active pressure mode. During implement lift, a check valve allows hydraulic flow from the cylinders to bypass the pressure reduction valve. The system therefore operates at lower pressure and lower power to produce less heat and increase fuel economy. The above patent application does not provide for sequencing other than by cylinder sizing.

SUMMARY

A hydraulic latching circuit is provided that allows a load-sense power source to be activated and deactivated depending on the SCV function. The load sense power source is activated when the wing cylinders are fully extended to maintain proper down force on the wings. It remains activated or latched when the SCV is returned to neutral. It is deactivated or unlatched when the wing cylinders are retracted. Two circuits have been devised to accomplish this latching function. Both of these latching circuits can be used with the sequencing circuit.

DESCRIPTION

Figure 1:
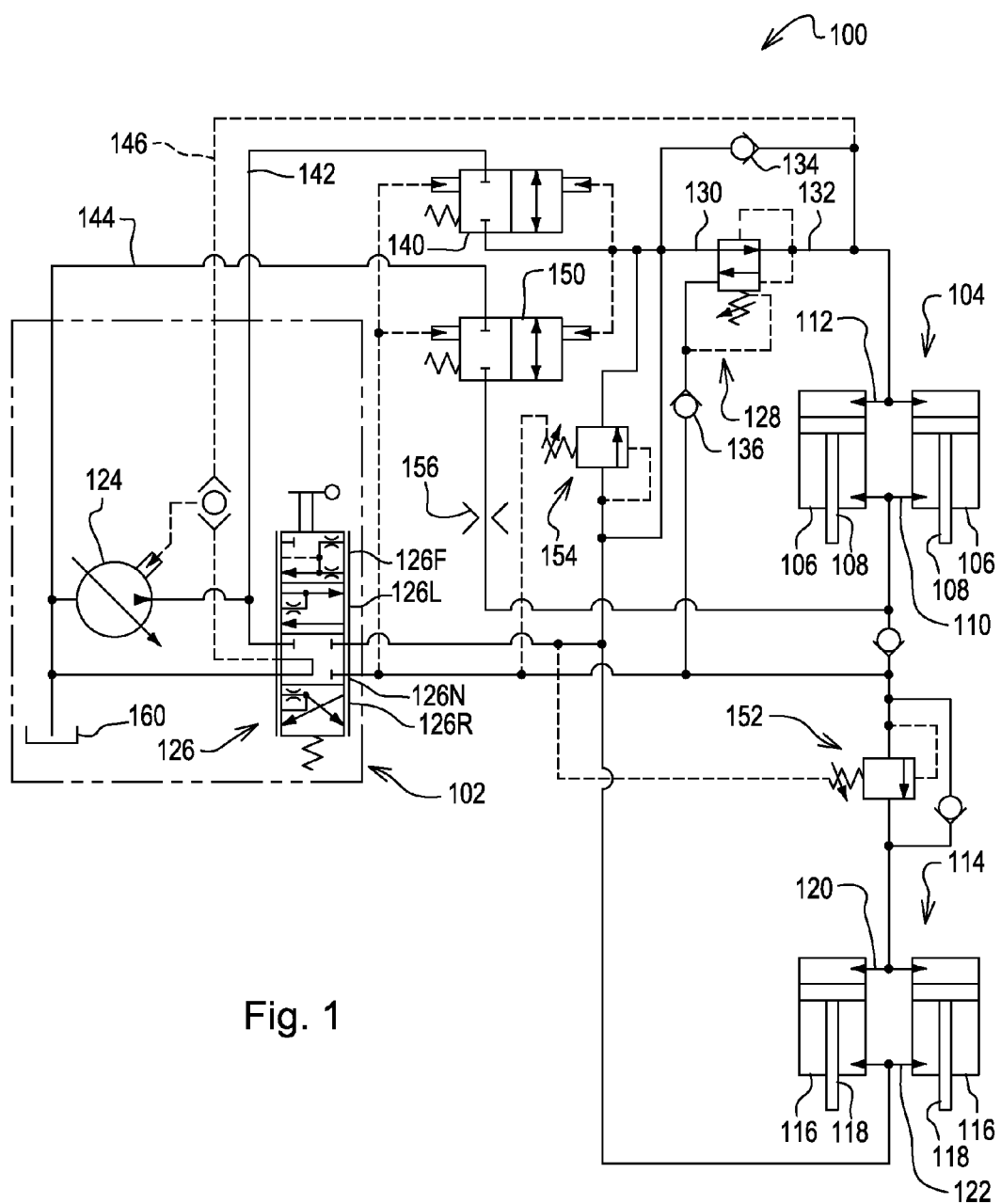
FIG. 1 is a hydraulic system schematic showing one implementation of the above described hydraulic circuit.

With reference to FIG. 1, hydraulic system 100 is shown. System 100 is an implement hydraulic system coupled to a tractor hydraulic system 102. The implement hydraulic system 100 includes an implement wing cylinder structure 104 shown with two cylinders 106. It should be understood that the wing cylinder structure 104 can have any number of cylinders 106 as desired. The implement wing, and the implement wing cylinder structure is configured such that the implement wings are lowered when the cylinder rods 108 are extended. However, the implement could be constructed such that the implement wings are lowered when the rods 108 are retracted. Thus, the hydraulic connections to the wing cylinder structure will be referred to in the claims as connections to a first end 116 or a second end 112 without regard to whether this is a reference to the cap end or rod end of the cylinders.

The hydraulic system 100 also includes an implement center frame cylinders structure 114 shown as having two cylinders 116. Again; any number of cylinders 116 may be included in the center frame cylinder structure. The implement center frame and center frame cylinder structure are constructed such that the implement is raised when the cylinder rods 118 are extended, and lowered when the rods 118 are retracted. Again, the implement could be structured such that the implement is raised when the rods 118 are retracted, thus the connections to the center frame cylinder structure will be referred to in the claims as connections to the first end or second end without regard to whether this reference is to the cap end or the rod end of the cylinders.

The first ends 110 and 120 of the wing cylinder structure and the center frame cylinder structure are connected to the SCV in parallel. Likewise, the second ends 112 and 122 of the wing cylinder structure and the center frame cylinder structure are connected to the SCV in parallel.

The tractor hydraulic system 102 includes a load sense controlled pump 124 that provides flow to a selective control valve (SCV) 126. The selective control valve has a neutral position 126N, a first open position 126R used to raise the implement and wings, a second open position 126L used to lower the wings and the implement, and a float position 126F. The SCV thus controls the raising and lowering of the implement.

A pressure reducing/relieving valve 128 regulates the pressure delivered to the second end 112 of the wing cylinder structure 104. The pressure reducing/relieving valve 128 has an inlet 130, an outlet 132 and a return check valve 134 that allows flow to bypass the pressure reducing/relieving valve 128 during retraction of the rods 108 of the wing cylinder structure. A drain check valve 136 protects the pressure reducing/relieving valve during wing cylinder structure retraction.

A hydraulic latching function is provided in the circuit by first and second dual-pilot-operated, two-way, two-position, normally-closed directional valves 140, 150. The first directional valve 140 is placed in a power beyond supply connection 142 from the pump to the inlet 130 of the pressure reducing/relieving valve 128. The second directional valve 150 is located in the power beyond return connection 144 between first end 110 of the wing cylinder structure and the tank 160. These directional valves may be combined into one dual-pilot-operated, four-way, two-position valve. A load sense pressure line 146 is provided between the outlet 132 of the valve 128 and the pump 124. The system 100 further includes first and second sequence valves 152, 154. First sequencing valve 152 is in the parallel connection to the first end 120 of the center frame cylinder structure. Second sequencing valve 154 is in the parallel connection to the second end of the wing cylinder structure.

When the SCV 126 is actuated to raise the implement, that is, the SCV is moved to the first open position 126R, the first sequence valve 152 prevents the center frame cylinder structure from extending until the sequence valve 152 set pressure is reached. However, oil is allowed to enter the first end 110 of the wing cylinder structure. Oil freely exits the second end of the wing cylinder structure through the return check valve 134. Once the wing cylinder structure is fully retracted, the supply pressure builds until the first sequence valve 152 opens. Then the center frame cylinder structure extends.

When the SCV 126 is actuated to retract the center frame cylinders and thus lower the implement, that is, the SCV is moved to the first open position 126L, Supply fluid is directed to the second ends 122 of the center frame cylinder structure. The sequence valve 152 bypass check valve allows free return of oil from the first end of the center frame cylinder structure. Once the center frame cylinder structure is fully retracted, the supply pressure builds until the second sequence valve 154 set pressure is reached. When the second sequence valve opens, oil pressure from the SCV is provided to the pilot of the directional valves 140, 150 causing the directional valves to open. When directional valve 150 is open, oil is allowed to freely exit the first end 110 of the wing cylinder structure allowing the rods 108 to extend and lower the implement wings. When the first directional valve 140 is open, power beyond supply is connected to the second end 112 of the wing cylinder structure and to the pilot port of the directional valves 140, 150. This latches the power beyond pressure to the wing cylinder structure to provide active down force to the wing cylinder structure. Additionally, since the power beyond supply pressure is used to pilot the directional valves 140, 150 the directional valves will remain open when the SCV 126 is returned to the neutral position 126N.

The directional valves remain open until the SCV 126 is actuated to the first open position 126R to raise the implement or if the SCV is moved to the float position 126F. When the SCV is moved to the first open position 126R, pilot pressure provided to the directional valves 140, 150 closes the valves. When the SCV is moved to the float position 126F, the pilot pressures on the directional valves 140, 150 equalize, allowing the springs to close the directional valves, deactivating the down force circuit. If the directional valves 140, 150 are open during the start of an implement raise cycle, then oil would also flow through the orifice 156 and the second directional valve 150 to the power beyond return. As this oil flow increases, the orifice would cause ample pressure when coupled with the spring force to close the directional valve 150.

If power beyond is not available on the tractor, then the power beyond supply ports to directional valve 140 and the power beyond return port to directional valve 150 are plugged. The implement can then be operated with the SCV. A down force mode then requires the SCV to be in the second open position 126L.

The system 100 provides a sequencing for the desired operation of the center frame cylinder structure and the wing cylinder structure and also provides hydraulic latching to activate down force control on the wing cylinder structure.

Figure 2:
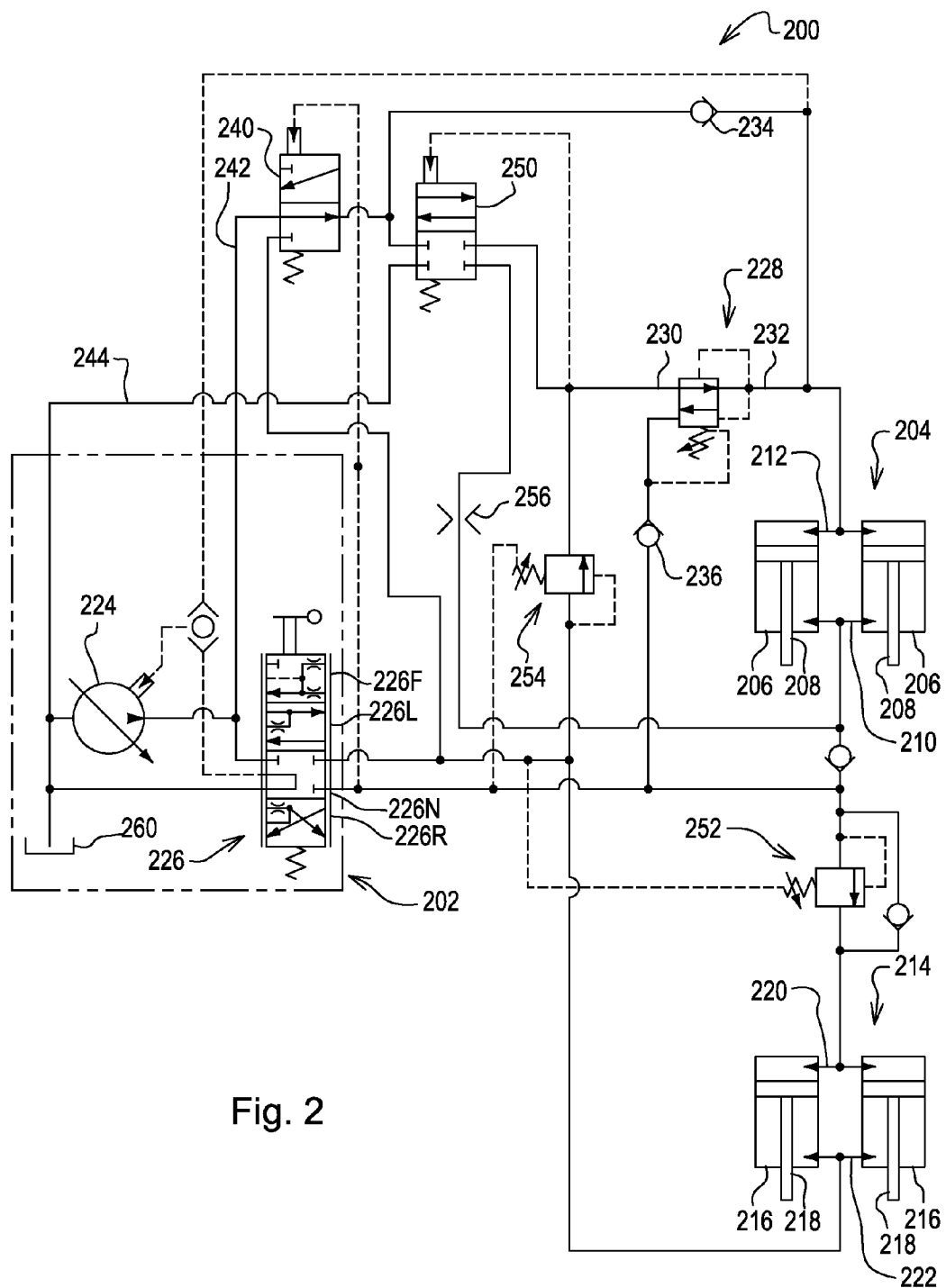
FIG. 2 is a hydraulic system schematic showing another implementation of the above described hydraulic circuit.

Turning to FIG. 2, another hydraulic system 200 is shown. In many respects system 200 is identical to system 100. Similar or identical components are given the same reference numeral beginning with 2 instead of 1. System 200 uses the same sequencing as system 100 but it is a different latching circuit. Here, latching is accomplished by a normally-open, three-way, two-position, pilot-operated, directional valve 240 and a normally-closed, four-way, two-position, pilot-operated, directional valve 250. When the center frame cylinder structure 214 is fully retracted, sequence valve 254 opens which pilots the directional valve 250 open, opening the power beyond supply connection 242 to the pressure reducing/relieving valve 228 to the second end 212 of the wing cylinder structure. When the SCV 226 is returned to the neutral/closed position, 226N, power beyond pressure continues to pilot the directional valve 250 open. When the SCV is shifted to the first open position 226R to raise the implement, the directional valve 240 is piloted closed. The valve 240 then cuts off power beyond supply from the valve 228 deactivates the down force the wings. The directional valve 250 is also returned to the closed position. Oil from the second end 212 of the wing cylinder structure returns through the check valve 234 and through the directional valve 240 to the SCV and then to the tank 260.

The hydraulic systems use hydraulic latching to allow a load sense power source to be activated and deactivated by the SCV. The load sense power source is activated when the cylinders of the wing cylinder structure are fully extended as shown, or fully retracted. The load sense power source remains activated, that is latched, when the SCV is returned to neutral. It is deactivated or unlatched when the cylinders are retracted as shown.

Having described the hydraulic systems, it will become apparent that various modifications can be made without departing from the scope of the accompanying claims.

What is claimed is:

1. An implement hydraulic system for use with a tractor having a load sense controlled pump and a multi-position selective control valve (SCV) having a closed neutral position, a first open position and a second open position, the SCV connected between the pump and the implement hydraulic system, the implement hydraulic system comprising:
   an implement wing cylinder structure having first and second ends;
   an implement center frame cylinder structure having first and second ends;

an adjustable pressure valve, having an input and an output, connected between the selective control valve and the wing cylinder structure second end;

a power beyond supply connection from the pump to the input of the adjustable pressure valve, the power beyond supply connection providing a source of hydraulic fluid under pressure to the adjustable pressure valve independently of hydraulic fluid under pressure from the selective control valve;

a load-sense connection from the output of the adjustable pressure valve to the pump;

latching valve means in the power beyond supply connection for opening and closing the connection, the latching valve means operable to close the connection until after fluid pressure from the selective control valve has been applied to the second end of the wing cylinder structure after which the valve means opens the connection and maintains the connection open when the selective control valve is returned to the neutral position;

a first sequencing valve to direct fluid to the first end of the wing cylinder structure then to the first end of the center frame cylinder structure when the SCV is in the first open position; and a second sequencing valve to direct fluid to the second end of the center frame cylinder structure then to the second end of the wing cylinder structure when the SCV is in the second open position.

2. The implement hydraulic system as defined in claim 1 further comprising a power beyond return connection between the pump and the first end of the wing cylinder structure and wherein the latching valve means includes a normally closed first directional valve in the power beyond supply connection from the pump to the input of the adjustable pressure valve that is piloted to open when the SCV is moved to the second open position and a second directional valve located in the power beyond return connection, the second directional valve being normally closed and piloted open when the SCV is moved to the second open position.

3. The implement hydraulic system as defined in claim 2 wherein the first and second directional valves remain piloted open by power beyond supply pressure when the SCV is returned to the neutral position.

4. The system as defined by claim 2 wherein the first and second directional valves are dual piloted valves with pilot pressure to close the valves supplied by the system pressure when the SCV is in the second open position.

5. The system as defined in claim 2 where in the first and second directional valves are formed as a four-way, two-position valve.

6. The system as defined in claim 1 wherein the latching valve means includes:

a first directional valve in the power beyond supply connection, the first directional valve being normally open and moved to a closed position when the SCV is moved to the first open position, and a normally closed second directional valve in the power beyond supply connection that is moved to an open position when the SCV is moved to the second open position.

7. The system as defined by claim 6 wherein the first directional valve is a three-way, two-position valve.

8. The system as defined by claim 6 wherein the second directional valve is a four-way, two-position valve.

9. The system as defined by claim 1 further comprising parallel connections from the SCV to the first ends of the wing cylinder structure and the center frame cylinder structure and wherein the first sequencing valve is in the parallel connection to the first end of the center frame cylinder structure.

10. The system as defined by claim 1 further comprising parallel connections from the SCV to the second ends of the wing cylinder structure and the center frame cylinder structure wherein the second sequencing valve is in the parallel connection to the second end of the wing cylinder structure.

* * * * *